United States Patent
Rakshit

(10) Patent No.: US 8,874,265 B2
(45) Date of Patent: Oct. 28, 2014

(54) ROBOT-BASED MATERIAL REMOVAL IN UNSTABLE STATIC EQUILIBRIUM SYSTEM

(75) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 13/595,063

(22) Filed: Aug. 27, 2012

(65) Prior Publication Data

US 2014/0058562 A1 Feb. 27, 2014

(51) Int. Cl.
*B25J 9/16* (2006.01)
*B25J 11/00* (2006.01)

(52) U.S. Cl.
USPC ............... 700/250; 700/253; 901/50; 901/31

(58) Field of Classification Search
USPC ............... 700/250, 253, 255, 258, 259, 262; 701/50; 901/2, 31, 32, 50; 299/1.1
See application file for complete search history.

(56) References Cited

U.S. PATENT DOCUMENTS

| | | | | |
|---|---|---|---|---|
| 6,363,632 | B1 * | 4/2002 | Stentz et al. | 37/414 |
| 7,089,084 | B2 | 8/2006 | Ohta et al. | |
| 8,527,155 | B2 * | 9/2013 | Gudat | 701/50 |
| 8,559,699 | B2 * | 10/2013 | Boca | 382/153 |
| 8,630,737 | B2 * | 1/2014 | Oda | 700/259 |
| 2006/0090378 | A1 * | 5/2006 | Furem | 37/443 |
| 2010/0070125 | A1 | 3/2010 | Lee et al. | |
| 2010/0094459 | A1 | 4/2010 | Cho et al. | |
| 2011/0211938 | A1 * | 9/2011 | Eakins et al. | 414/738 |

FOREIGN PATENT DOCUMENTS

EP 1607194 B1 10/2008

OTHER PUBLICATIONS

Evgeni Magid et al., "Building a Search Tree for a Pilot System of a Rescue Search Robot in a Discretized Random Step Environment", Journal of Robotics and Mechatronics, vol. 23, No. 4, p. 568, 2011.
Yu Zhou, "Distributed Control of Multi-Robot Deployment Motion", Motion Control, Chapter 14, p. 281, Jan. 2010.
Evgeni Magid et al., "Static Balance for Rescue Robot Navigation: Losing Balance on Purpose within Random Step Environment", IEEE/RSJ International Conference on Intelligent Robots and Systems, p. 350, Oct. 18-22, 2010.
Dushyant Palejiya et al., "Hybrid Velocity/Force Control for Robot Navigation in Compliant Unknown Environments", Journal Robotica, vol. 24, Issue 6, p. 3, Nov. 2006.
Louis L. Bucciarelli, "Engineering Mechanics for Structures", Chapter 2, Dover Publications, pp. 2.3-2.42, Mar. 2009.
Michael Gurney, "Computing Advances Permit New Integration Answers", Design News, URL: http://www.designnews.com/document.asp?doc_id=230438, Apr. 14, 2011.

* cited by examiner

*Primary Examiner* — Jason Holloway
(74) *Attorney, Agent, or Firm* — Law Offices of Ira D. Blecker, P.C.

(57) ABSTRACT

Method and System of removing material from a debris pile which includes blocks of material. The debris pile is characterized to create a static equilibrium diagram illustrating one or more forces acting on each of the plurality of blocks of material. The blocks are ranked according to a number of touch points that each block of material touches another block of material. A block having a least number of touch points is identified. The block is removed from the static equilibrium diagram. It is determined if the block is removable by a robot. It is determined if the pile of debris would be in static equilibrium after removal of the block. The robot is directed to remove the block. Also included is a computer program product.

23 Claims, 8 Drawing Sheets

| FORCE | TYPE |
|---|---|
| $F_y$ | $F_y$ IS A COMPONENT FORCE EQUAL AND OPPOSITE OF $W_2(1)Sin\theta$ |
| $F_x$ | $F_x$ IS A COMPONENT FORCE EQUAL AND OPPOSITE OF FRICTIONAL FORCE $\mu W_2(1)Sin\theta$ |
| $W_2(3)$ | $W_2(3)$ IS DISTRIBUTED LOAD OF BLOCK 102(2) ON BLOCK 102(3) |
| $W_2(1)$ | $W_2(1)$ IS DISTRIBUTED LOAD OF BLOCK 102(2) ON BLOCK 102(1) |
| $W_2(1)Sin\theta$ | $W_2(1)Sin\theta$ IS A COMPONENT FORCE OF W2 ON BLOCK 102(1) |
| $\mu W_2(1)Sin\theta$ | $\mu W_2(1)Sin\theta$ IS THE FRICTIONAL FORCE OF BLOCK 102(2) ON BLOCK 102(1) |
| $(W_2(1) + W_2(3))Cos\phi$ | $(W_2(1) + W_2(3))Cos\phi$ IS THE TOTAL VERTICAL COMPONENT FORCE OF THE BLOCK 102(2) |

FIG. 4B

ROBOT-BASED MATERIAL REMOVAL IN UNSTABLE STATIC EQUILIBRIUM SYSTEM

BACKGROUND

The present exemplary embodiments relate to systems for searching a pile of debris, and more particularly, relate to systems for characterizing a pile of debris in unstable static equilibrium and removing material from such a pile of debris in a particular way by one or more robots to avoid collapse of the pile of debris.

During disasters, for example, which may cause large scale destruction, piles of debris may be created which necessitate searching them for victims. Robots may be used for searching. These robots such as a rescue robot will look for casualties while removing obstacles such as rubble using a multi-degree-of-freedom manipulator. The usage of such robots will allow access to harsh environments such as an area with the danger of disruption, fire disaster, toxic gas, and the like as a substitute for people doing the searching. The robots are expected to move large mountains of rubble as well as transporting a victim outside the area of disaster.

The pile of debris may create an unstable static equilibrium system. At the time of searching the pile of debris and removing pieces of debris, there may be another disaster if the removal of material is not done properly and carefully. Unplanned removal of material from the pile of debris may collapse the unstable equilibrium system.

BRIEF SUMMARY

The various advantages and purposes of the exemplary embodiments as described above and hereafter are achieved by providing, according to a first aspect of the exemplary embodiments, a method of removing material from a pile of debris including a plurality of blocks of material. The method including: (a) characterizing the pile of debris to create a static equilibrium diagram illustrating one or more forces acting on each of the plurality of blocks of material; (b) ranking the plurality of blocks of material according to a number of touch points that each block of material touches another block of material; (c) identifying at least one block having a least number of touch points; (d) removing the at least one block from the static equilibrium diagram; (e) determining if the at least one block is removable by a robot; (f) determining if the pile of debris would be in static equilibrium after removal of the at least one block; and (g) directing the robot to remove the at least one block, (h) wherein the method is performed on one or more computing devices.

According to a second aspect of the exemplary embodiments, there is provided a method of characterizing a pile of debris. The method including: visually segregating the pile of debris into each of a plurality of blocks; visually capturing a size, shape of color of each of the plurality of blocks; identifying an angular displacement of each of the plurality of blocks; visually identifying materials that comprise each of the plurality of blocks from the color of each of the plurality of blocks; identifying a density of each of the plurality of blocks from the materials that comprise each of the plurality of blocks; identifying a coefficient of friction of each of the plurality of blocks from the materials that comprise each of the plurality of blocks; determining a weight of each of the plurality of blocks from the materials, size and shape of each of the plurality of blocks; visually identifying touch points of each of the plurality of blocks and determining at least one applied force at each of the touch points; determining external forces applied to the pile of debris; and creating a static equilibrium diagram for the pile of debris; wherein characterizing the pile of debris is performed on one or more computing devices.

According to a third aspect of the exemplary embodiments, there is provided a computer program product for removing material from a pile of debris including a plurality of blocks of material, the computer program product including: a non-transitory computer readable storage medium having computer readable program code embodied therewith. The computer readable program code including: (a) computer readable program code configured to characterize the pile of debris to create a static equilibrium diagram illustrating one or more forces acting on each of the plurality of blocks of material; (b) computer readable program code configured to rank the plurality of blocks of material according to a number of touch points that each block of material touches another block of material; (c) computer readable program code configured to identify at least one block having a least number of touch points; (d) computer readable program code configured to remove the at least one block from the static equilibrium diagram; (e) computer readable program code configured to determine if the at least one block is removable by a robot; (f) computer readable program code configured to determine if the pile of debris would be in static equilibrium after removal of the at least one block; and (g) computer readable program code configured to direct the robot to remove the at least one block.

According to a fourth aspect of the exemplary embodiments, there is provided a computer program product for characterizing a pile of debris, the computer program product including: a non-transitory computer readable storage medium having computer readable program code embodied therewith, the computer readable program code including: computer readable program code configured to visually segregate the pile of debris into each of the plurality of blocks; computer readable program code configured to visually capture a size, shape of color of each of the plurality of blocks; computer readable program code configured to visually identify an angular displacement of each of the plurality of blocks; computer readable program code configured to visually identify materials that comprise each of the plurality of blocks from the color of each of the plurality of blocks; computer readable program code configured to identify a density of each of the plurality of blocks from the materials that comprise each of the plurality of blocks; computer readable program code configured to identify coefficient of friction of each of the plurality of blocks from the materials that comprise each of the plurality of blocks; computer readable program code configured to determine a weight of each of the plurality of blocks from the materials, size and shape of each of the plurality of blocks; computer readable program code configured to visually identify touch points of each of the plurality of blocks and determine at least one applied force at each of the touch points; computer readable program code configured to determine external forces applied to the pile of debris; and computer readable program code configured to create a static equilibrium diagram for the pile of debris.

According to a fifth aspect of the exemplary embodiment, there is provided a system of removing material from a pile of debris including a plurality of blocks of material. The system including: a plurality of video devices surrounding a pile of debris; at least one computer processor in cooperation with the plurality of video devices to characterize the pile of debris to create a static equilibrium diagram illustrating one or more forces acting on each of the plurality of blocks of material; a module in the at least one computer processor to rank the plurality of blocks of material according to a number of touch points that each block of material touches another block of material; a module in the at least one computer processor to identify at least one block having a least number of touch points; a module in the at least one computer processor to remove the at least one block from the static equilibrium diagram; a module in the at least one computer processor to determine if the at least one block is removable by a robot; a module in the at least one computer processor to determine if the pile of debris would be in static equilibrium after removal of the at least one block; and a module in the at least one computer processor to direct the robot to remove the at least one block from the pile of debris.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 4A is a schematic illustration of a subset of the blocks in FIG. 3 showing the forces acting on the blocks and FIG. 4B is a table describing each of the forces in FIG. 4A.

DETAILED DESCRIPTION

The exemplary embodiments pertain to a method and system by which one or more robots may be used to remove material in an unstable static equilibrium system. The size and weight of each and every block in a pile of debris, and their relative positions, may be determined. An equivalent unstable static equilibrium model may be created and may identify blocks to be removed and the order of removal. One or more robots may remove the blocks from the pile of debris.

Figure 1:
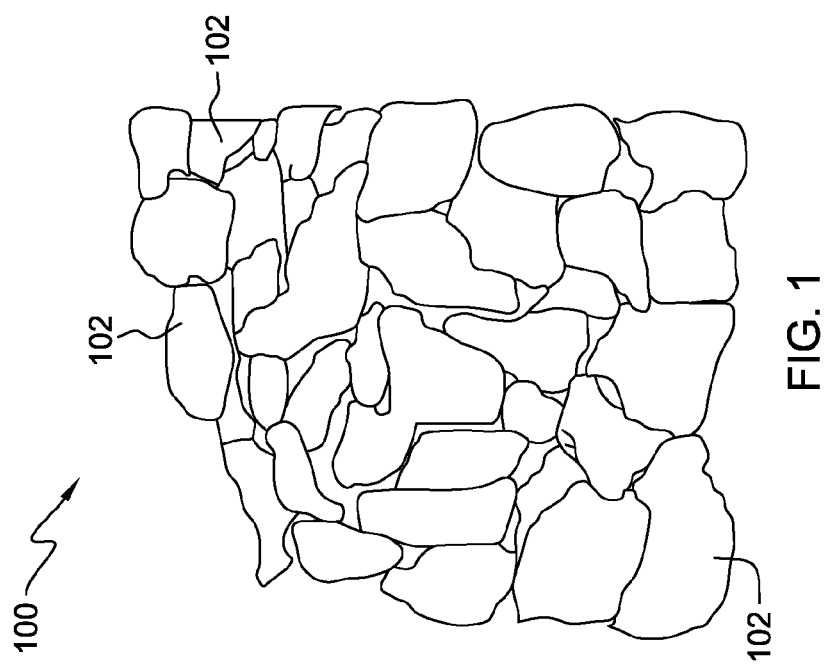
FIG. 1 illustrates a pile of debris as a result of an event such as a disaster.

Referring now more specifically to the Figures, and particularly referring to FIG. 1, there is illustrated a pile of debris 100 such as might occur after a disaster such as a building collapse or earthquake. The pile of debris 100 is made up of a plurality of individual blocks 102 of different sizes and shapes. Robots may be used to disassemble the pile of debris 100 but since the pile of debris 100 is in an unstable static equilibrium condition, the removal of the wrong block 102 could cause a partial or total collapse of the pile of debris 100, thereby compounding the disaster.

Applicants have proposed a solution for removal of the blocks 102 without causing a partial or total collapse of the pile of debris 100.

Figure 2:
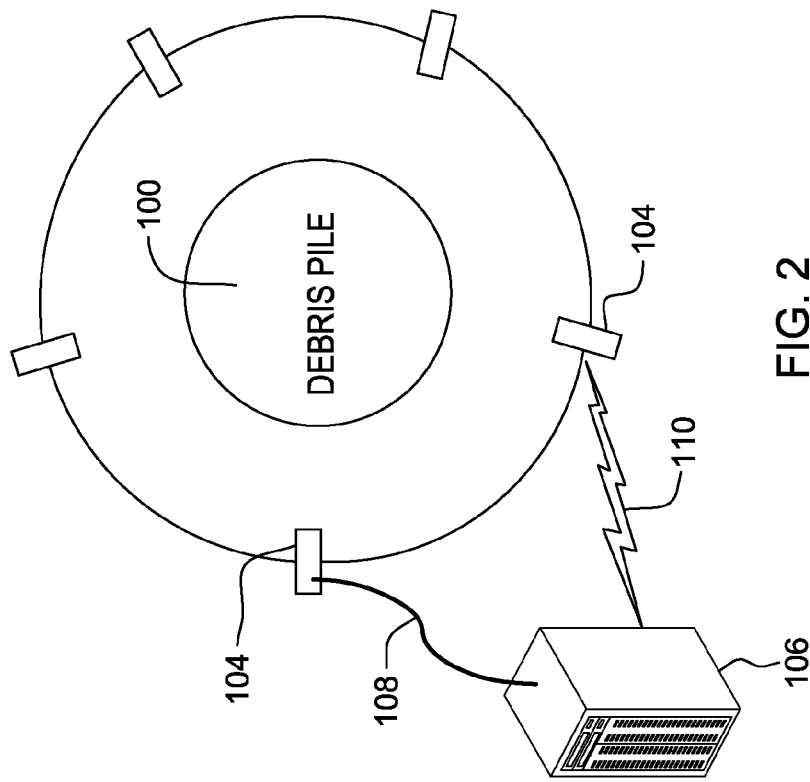
FIG. 2 illustrates an exemplary embodiment where a plurality of video devices in communication with a computer are disposed around the pile of debris in FIG. 1.

Referring now to FIG. 2, there are disposed around the pile of debris 100 a plurality of video devices 104 (for example, a video camera) which may provide a video feed to a computer 106. While only one computer 106 is shown, it should be understood that more than one computer 106 may be employed in the exemplary embodiments. The computer 106 may be connected by a wireline 108 or wirelessly 110 to the video devices 104. The computer 106 may be local to the video devices 104 or may be remotely located with respect to the video devices 104. The computer 106 may be any type of computer including a desktop computer, laptop computer, workstation computer or a mainframe computer. It is anticipated that portable devices such as smartphones may someday have sufficient computing capability to perform in the exemplary embodiments.

Figure 3:
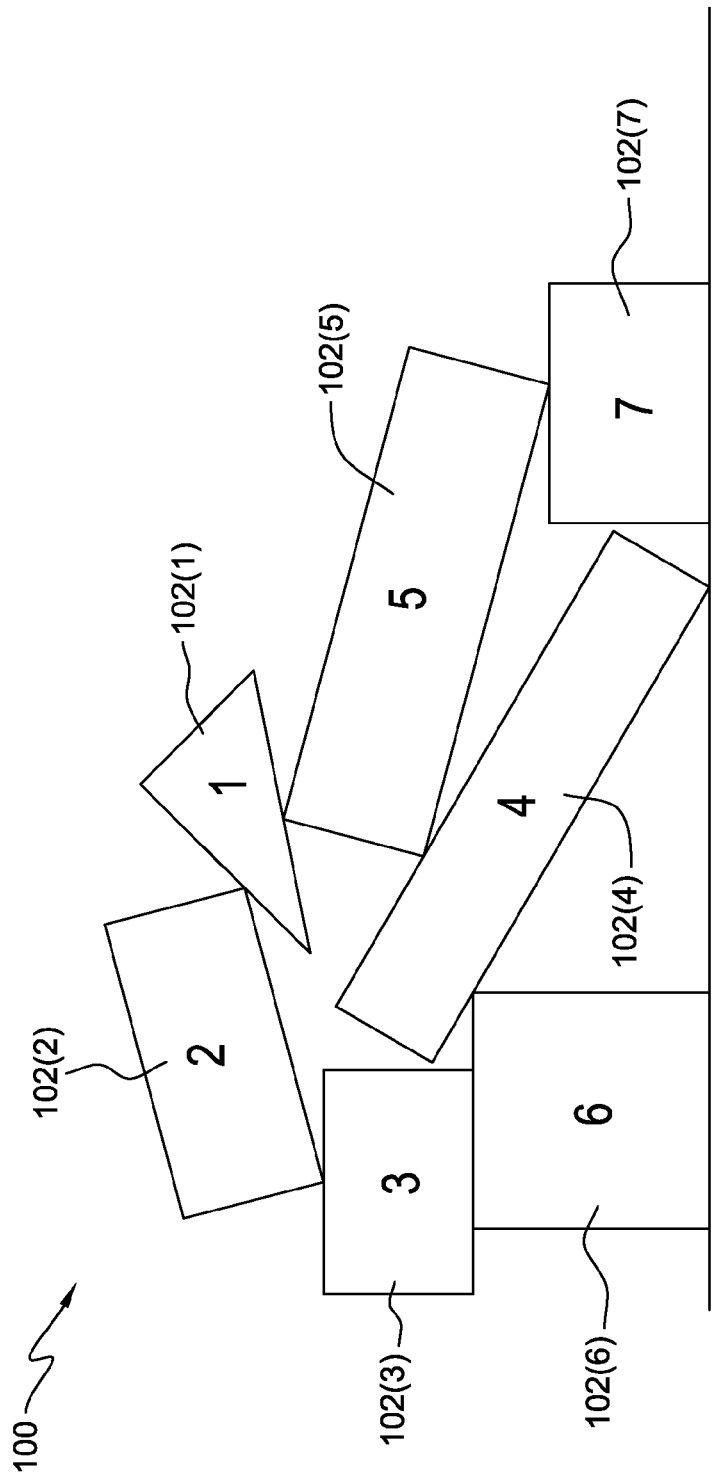
FIG. 3 schematically illustrates several of the blocks making up the pile of debris in FIG. 1.

FIG. 3 illustrates schematically a series of blocks 102(1) to 102(7) that may make up the pile of debris 100 in unstable static equilibrium. Static equilibrium may be defined as a system of particles where all the particles of the system are at rest and the total force on each particle is permanently zero. In the present situation, if any object is removed from the system, then the system may become unstable due to an unbalanced force. Thus, if block 102(1) were to be removed from the pile of debris 100, the entire pile of debris 100 comprised of blocks 102(1)-(7) may collapse.

Figure 4A:
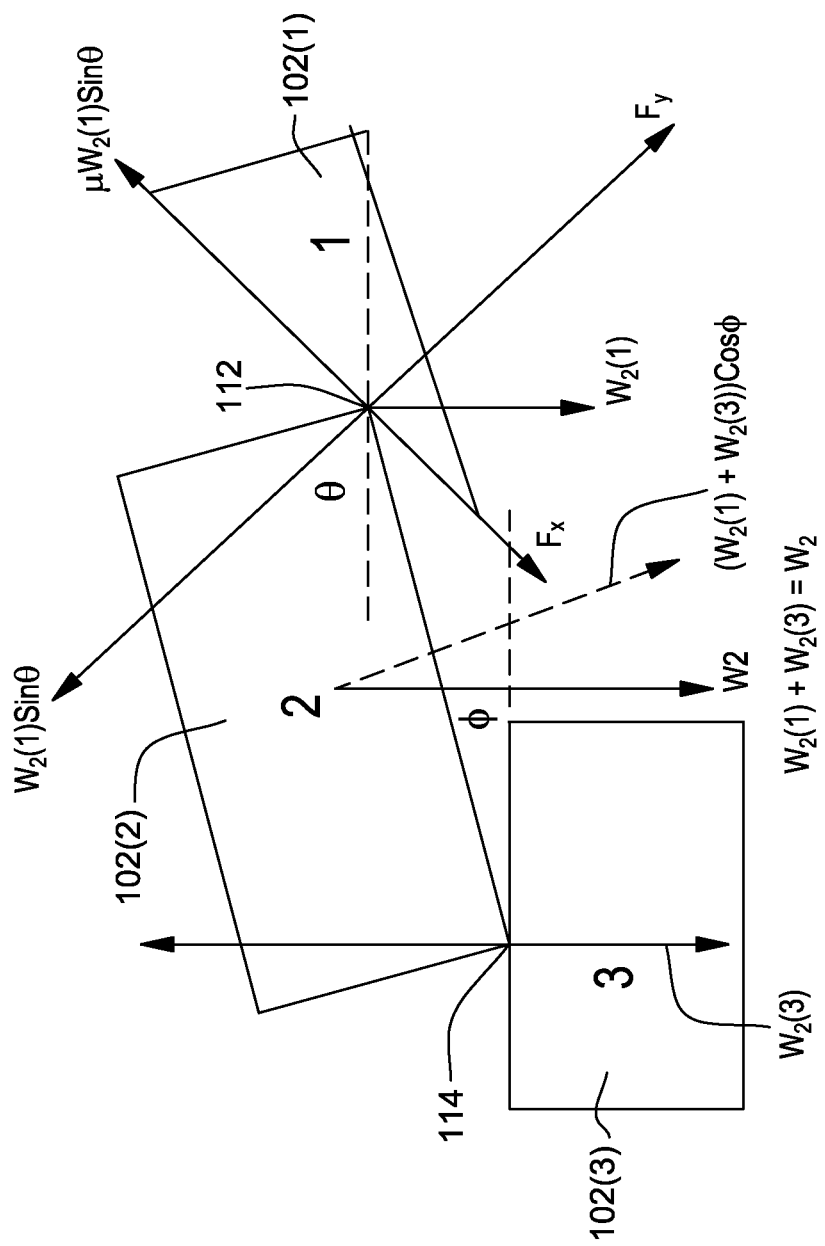

FIG. 4A illustrates a subset of the pile of debris 100 consisting of blocks 102(1), 102(2) and 102(3). Blocks 102(1) and 102(2) touch at point 112, also referred to as a touchpoint. Blocks 102(2) and 102(3) touch at touchpoint 114. The various forces acting between blocks 102(1), 102(2) and 102(3) are illustrated in FIG. 4A and described in FIG. 4B. The various forces include frictional forces, component forces and resultant forces. Frictional forces represent friction between two or more solid objects that are not moving relative to each other. Forces acting at some angle from the coordinate axes can be resolved into mutually perpendicular forces called component forces. The component of a force parallel to the x-axis is called the x-component, parallel to the y-axis the y-component, and so on. Resultant forces are the vector sum of all the forces acting on each block in the pile of debris 100.

The arrangement of blocks 102(1), 102(2), 102(3) in FIG. 4A is static because each and every touchpoint 112, 114 has equal and opposite forces. In the following discussion, the weight of block 102(2) is labeled as $W_2$, the weight of block 102(2) on block 102(1) is labeled $W_2(1)$ and the weight of block 102(2) on block 102(3) is labeled $W_2(3)$ such that $W_2(1)+W_2(3)=W_2$. If block 102(1) were to be removed, then there will not be any forces such as $F_y$, $F_x$, $W_2(1)\sin\theta$ or $\mu W_2(1)\sin\theta$. However, there would be an unbalanced force—$(W_2(1)+W_2(3))\cos\phi$—and this force will upset the static equilibrium and may cause a partial or total collapse of the pile of debris 100.

It is clear that if block 102(1) is removed, the static equilibrium will be upset. However, if blocks 102(1) and 102(2) are removed together, the unbalanced force—$(W_2(1)+W_2(3))\cos\phi$—will disappear and the static equilibrium will not be upset. Accordingly, the static equilibrium for the pile of debris 100 may be maintained.

Figure 5:
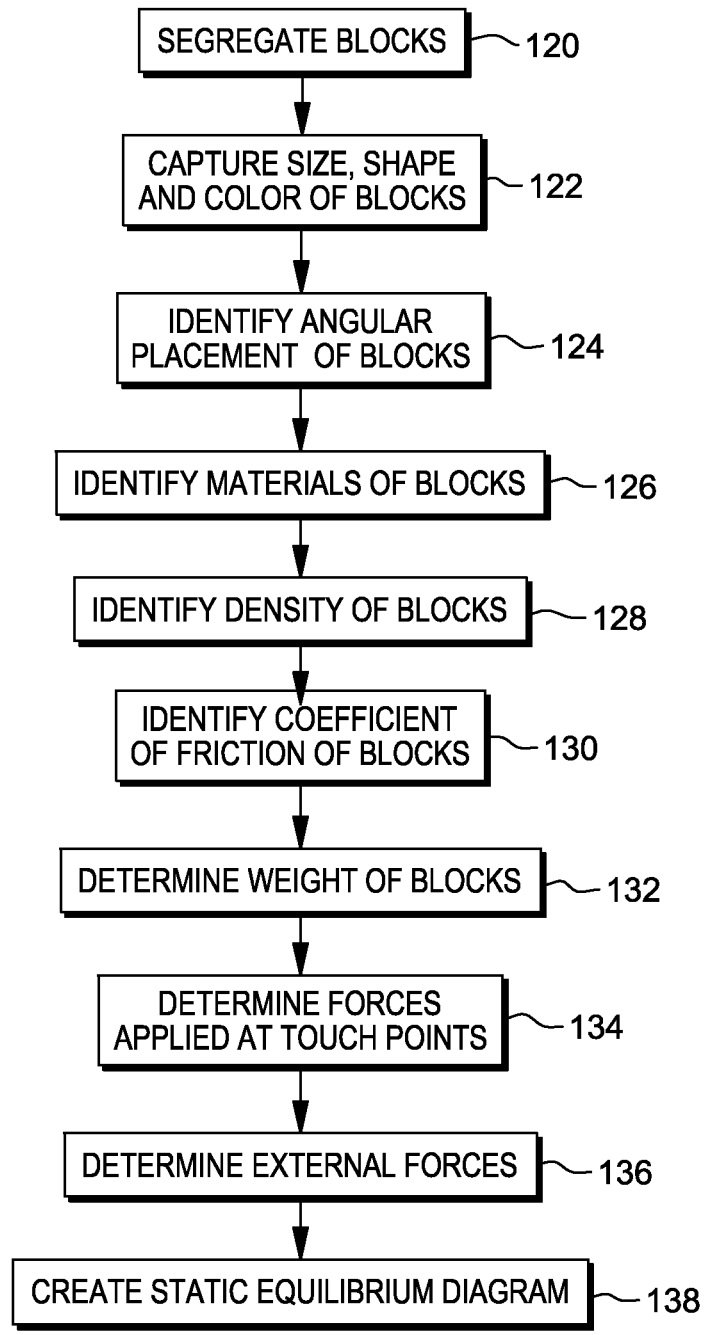
FIG. 5 is a flow chart of a process for characterizing the pile of debris in FIG. 1.

Referring now to FIG. 5, there is described the process for characterizing the pile of debris 100 to create a static equilibrium diagram. In general, the computer 106 through video devices 104 will visually identify each of the blocks 102(1)-(7) that make up the pile of debris and then determine their size, shape, weight and angular position. In a first step of the process, box 120, each block 102(1)-(7) is visually identified and segregated by the computer 106 through video devices 104.

The video devices 104 may visually capture the size, shape and color (including any patterns in the color) of each of the blocks 102A-G, box 122 and provide this information to computer 106.

In a further step, the video devices may visually identify the angular orientation of each of the blocks 102A-G, box 124 and provide this information to computer 106.

The materials of each of the blocks 102(1)-(7) may then be identified using the color of the blocks 102(1)-(7), box 126. It may be that the exact materials making up each of the blocks 102(1)-(7) cannot be determined with certainty. In that case, the best guess of the materials of each of the blocks 102(1)-(7) may be made.

Once the materials of each of the blocks 102(1)-(7) are known, or at least an educated guess has been made with respect to the materials, a database search may be conducted to identify the density and coefficient of friction of each of the blocks 102(1)-(7), boxes 128 and 130, respectively.

Using the density and size of each of the blocks 102(1)-(7), the weight of each of the blocks 102(1)-(7) may be determined by the computer 106, box 132.

Thereafter, the forces applied at each of the touchpoints, such as touchpoints 112, 114 in FIG. 4A, may be determined by the computer 106, box 134, using the principles of statics.

It may also be desirable to determine the external forces on the pile of debris 100, box 136. These external forces may include, but not be limited to, wind and precipitation. Determining the external forces is optional but also preferred to give a most complete picture of the forces acting on the pile of debris 100. The external forces may be represented as force vectors and determined using the principles of statics.

Once all of this information described with respect to FIG. 5 has been determined, a static equilibrium diagram for the pile of debris 100 may be created, box 138.

Figure 6:
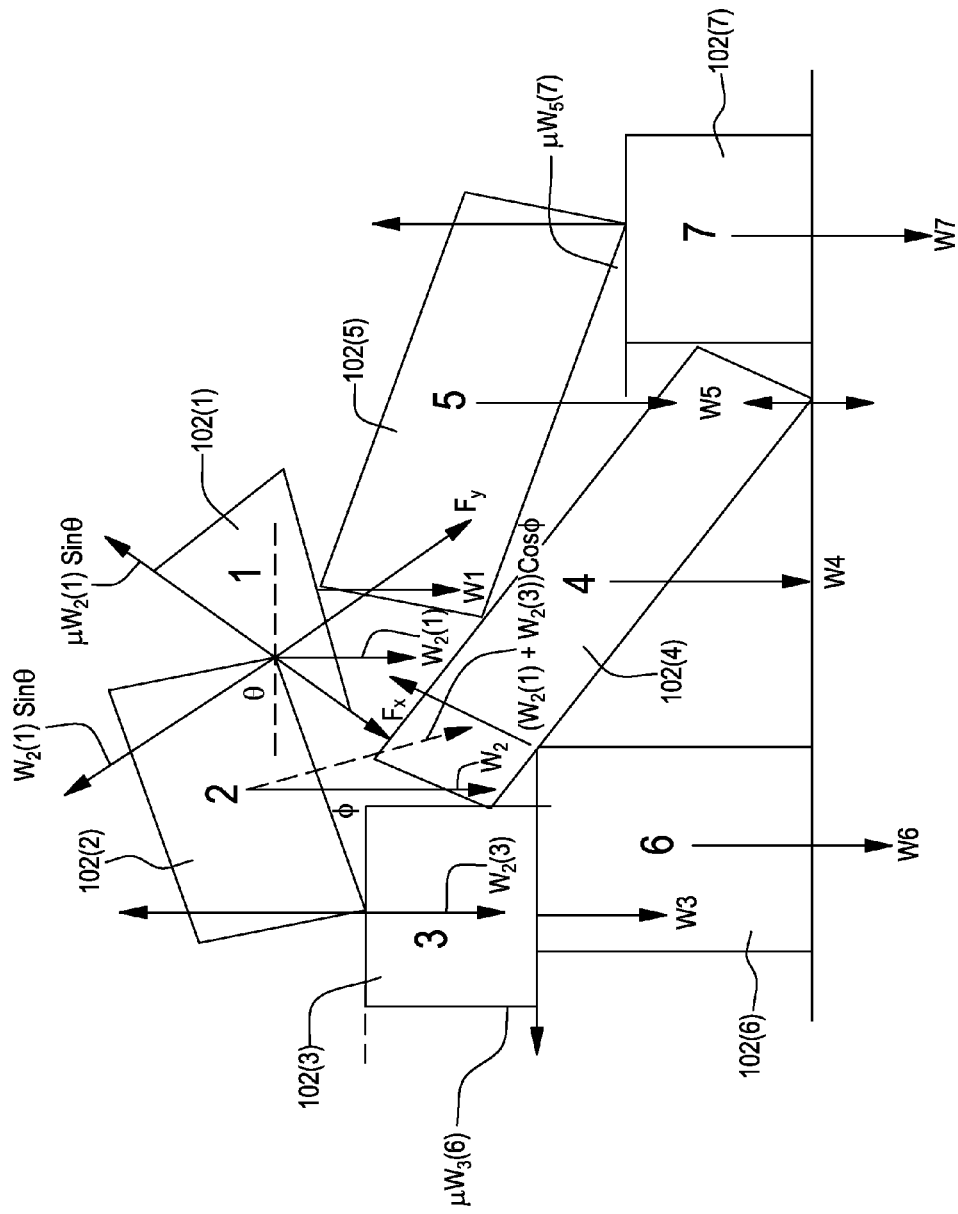
FIG. 6 is a static equilibrium diagram for the pile of debris in FIG. 1.

FIG. 6 illustrates a static equilibrium diagram for the pile of debris 100 that may be created in box 138 of FIG. 5. Shown therein are the forces from the subset of blocks in FIG. 4A as well as the major forces, that is, W1 through W7, for the blocks 102(1)-102(7), representing the weights of blocks 102(1) to 102(7).

Figure 7:
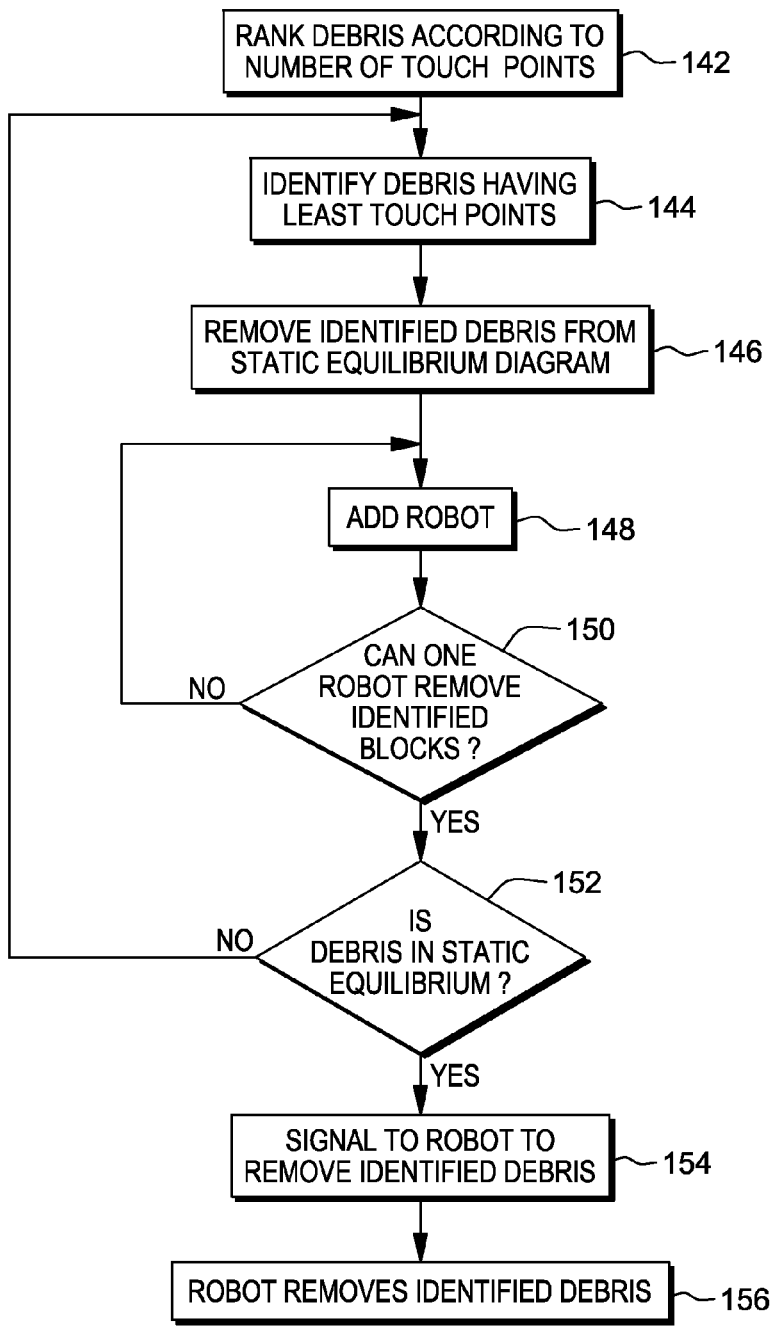
FIG. 7 is a flow chart of a process for removing a block from the pile of debris in FIG. 1.

Referring now to FIG. 7, the process for removing one or more blocks 102(1)-(7) will now be described.

Using the static equilibrium diagram just created (as described in FIG. 5 and shown in FIG. 6), the blocks 102(1)-(7) are ranked according to the number of touchpoints, box 142. Blocks are identified which have the least number of touch points, box 144.

Still using the static equilibrium diagram, one block having the least number of touchpoints is removed from the static equilibrium diagram, box 146.

A robot may be added to the process, box 148, and then it is determined if one robot may be able to remove the one block, box 150. That is, the robot's capability is evaluated to determine if it may be able to carry a block of the size and weight that is removed from the static equilibrium diagram in box 146. The static equilibrium diagram may be further consulted to determine if an additional robot may be needed to hold up a block while the one block is removed.

For example, referring back to FIG. 4A, if block 102(1) is chosen to be removed, a robot may be added in the process to carry block 102(1) as illustrated in box 148. It is then determined in box 150 if the robot may be able to carry block 102(1). It may also be determined that another robot may be necessary to remove block 102(1) because of its size and weight. It may be further determined in box 150 that a second robot may be necessary to hold block 102(2) while block 102(1) is removed. This may be necessary since there is an unbalanced load in that there are no opposing forces such as $F_y$, $W_2(1)\sin\theta$ or $\mu W_2(1)\sin\theta$ to support block 102(2) where block 102(1) used to be. In that case, the process proceeds backs to block 148 to add another robot. The process then proceeds to box 150 where it may be determined that no further robots are needed. The process then proceeds to the next step of determining whether the pile of debris is in static equilibrium.

As another example, block 102(2) (FIG. 4A) may be chosen to be removed in box 146. A robot may be added to the process to carry block 102(2). In box 150, it is determined that one robot is sufficient to carry block 102(2). The process then proceeds to the next step of determining whether the pile of debris is in static equilibrium.

At this point in the process, the block or blocks previously discussed (blocks 102(1) or 102(2)) have not actually been removed from the pile of debris 100. The static equilibrium diagram is checked, box 152, to see if the block or blocks removed, perhaps with the help of a robot or robots to hold up one or more of the remaining blocks in the pile of debris 100, leave the pile of debris 100 in static equilibrium. If not in static equilibrium, the process returns back to box 144 to identify debris having the least number of touchpoints. If in static equilibrium, the process proceeds to the next step.

A signal may be sent to the robot to remove the debris and if necessary, to one or more additional robots to hold up the remaining blocks in the pile of debris 100, box 154. Thereafter, box 156, the robot actually removes the identified block for removal and any additional robots hold up one or more of the remaining blocks if necessary.

Figure 8:
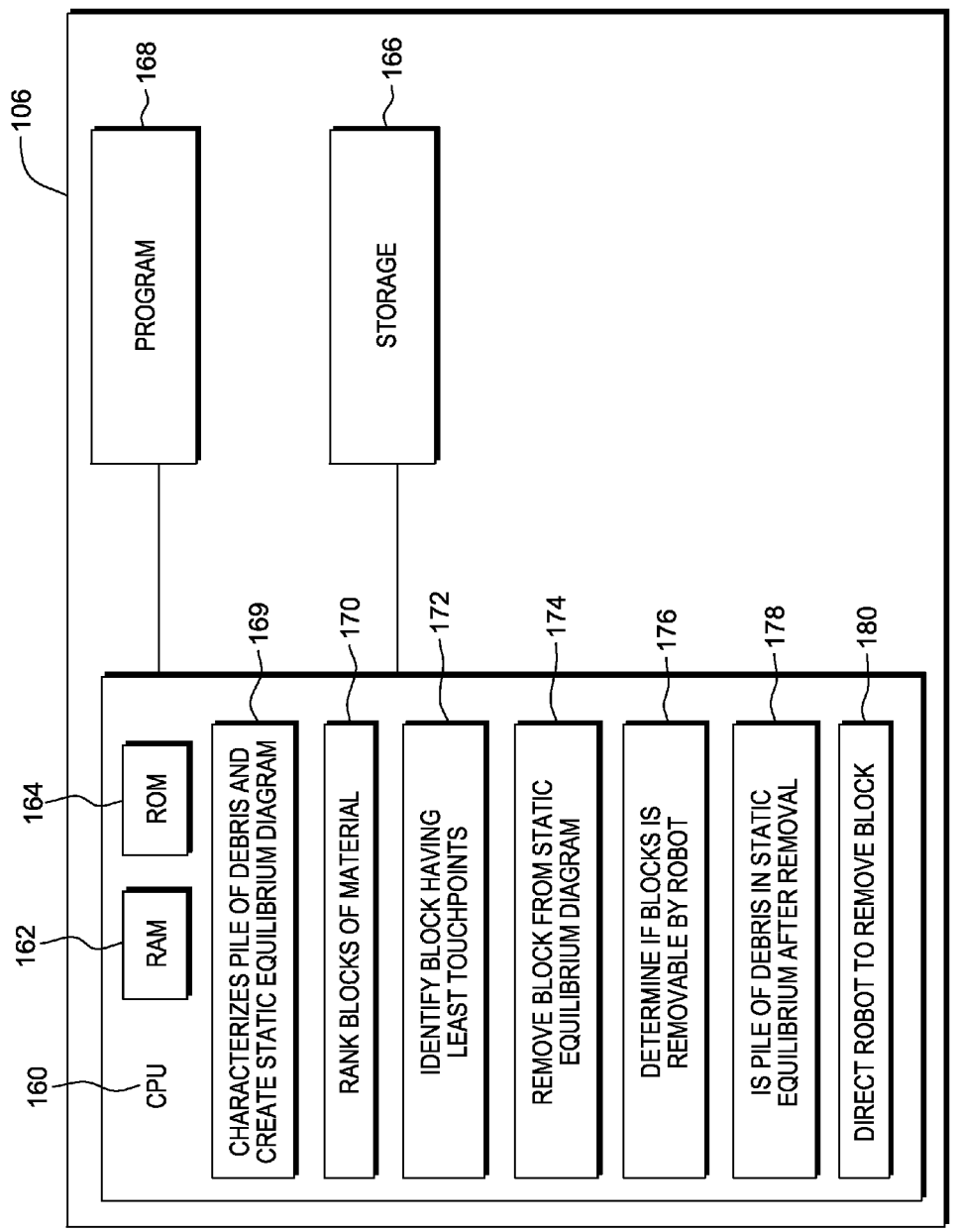
FIG. 8 is a block diagram of a computer hardware environment that may be used in practicing the exemplary embodiments.

The exemplary embodiments may further include a system of removing material from a pile of debris that includes a plurality of blocks of material. The system includes the plurality of video devices 104 and computer 106 shown in FIG. 2. The computer 106 is further described in FIG. 8.

The computer 106 may include at least one central processing unit (CPU) 160, random access memory (RAM) 162, read-only memory 164 and other components. Resident in the computer 106, or peripheral to it, may be a storage device 166 of some type such as a hard disk, floppy disk drive, CD-ROM drive, tape drive or other storage device.

Further included in computer 106 are program instructions 168 that may be tangibly and non-transitorily embodied in storage device 166 or peripheral thereto in another storage medium which, when read and executed by the CPU 160, causes the computer 106 to perform the steps necessary to execute the processes of the exemplary embodiments.

The at least one CPU 160 in cooperation with the plurality of video devices 104 characterize the pile of debris to create a static equilibrium diagram illustrating one or more forces acting on each of the plurality of blocks of material.

The CPU may further include one or more modules for executing parts of the exemplary embodiments. Thus, there may be a module 169 to characterize a pile of debris and create a static equilibrium diagram. There also may be a module 170 in the at least one CPU 160 to rank the plurality of blocks of material according to a number of touch points that each block of material touches another block of material. There may be a module 172 in the at least one CPU 160 to identify at least one block having a least number of touch points. There may also be a module 174 in the at least one CPU 160 to remove the at least one block from the static equilibrium diagram. The at least one CPU 160 may further include a module 176 to determine if the at least one block is removable by a robot, a module 178 to determine if the pile of debris would be in static equilibrium after removal of the at least one block, and a module 180 to direct the robot to remove the at least one block from the pile of debris.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages or even Microsoft Excel/Access. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of removing material from a pile of debris comprising a plurality of blocks of material, the method comprising:
    (a) characterizing the pile of debris to create a static equilibrium diagram illustrating one or more forces acting on each of the plurality of blocks of material;
    (b) ranking the plurality of blocks of material according to a number of touch points that each block of material touches another block of material;
    (c) identifying at least one block having a least number of touch points;
    (d) removing the at least one block from the static equilibrium diagram;
    (e) determining if the at least one block is removable by a robot;
    (f) determining if the pile of debris would be in static equilibrium after removal of the at least one block; and
    (g) directing the robot to remove the at least one block,
    (h) wherein the method is performed on one or more computing devices.

2. The method of claim 1 further comprising physically removing the at least one block by the robot.

3. The method of claim 1 wherein in step (e), the block is removable by at least two robots and in step (g), the at least two robots are directed to remove the at least one block.

4. The method of claim 3 further comprising physically removing the at least one block by the at least two robots.

5. The method of claim 1 wherein a result of determining in step (f) is that the pile of debris would not be in static equilibrium and further comprising repeating steps (c) to (f) until the result in step (f) is that the pile of debris would be in static equilibrium.

6. The method of claim 1 wherein in step (e), further determining if at least one additional robot is required to hold up at least one remaining block after removal of the at least one block.

7. The method of claim 1 wherein characterizing the pile of debris comprises:
    visually segregating the pile of debris into each of the plurality of blocks;
    visually capturing a size, shape of color of each of the plurality of blocks;
    visually identifying an angular displacement of each of the plurality of blocks;
    identifying materials that comprise each of the plurality of blocks from the color of each of the plurality of blocks;
    identifying a density of each of the plurality of blocks from the materials that comprise each of the plurality of blocks;
    identifying a coefficient of friction of each of the plurality of blocks from the materials that comprise each of the plurality of blocks;
    determining a weight of each of the plurality of blocks from the materials, size and shape of each of the plurality of blocks;
    visually identifying touch points of each of the plurality of blocks and determining at least one applied force at each of the touch points;
    determining external forces applied to the pile of debris; and
    creating a static equilibrium diagram for the pile of debris;
    wherein characterizing the pile of debris is performed on one or more computing devices.

8. The method of claim 7 wherein there are at least three applied forces at each of the touch points, the at least three applied forces being a frictional force, a component force and a resultant force.

9. The method of claim 7 wherein the external forces comprise wind and precipitation.

10. A method of characterizing a pile of debris comprising:
    visually segregating the pile of debris into each of a plurality of blocks;
    visually capturing a size, shape of color of each of the plurality of blocks;
    identifying an angular displacement of each of the plurality of blocks;
    visually identifying materials that comprise each of the plurality of blocks from the color of each of the plurality of blocks;
    identifying a density of each of the plurality of blocks from the materials that comprise each of the plurality of blocks;
    identifying a coefficient of friction of each of the plurality of blocks from the materials that comprise each of the plurality of blocks;
    determining a weight of each of the plurality of blocks from the materials, size and shape of each of the plurality of blocks;
    visually identifying touch points of each of the plurality of blocks and determining at least one applied force at each of the touch points;
    determining external forces applied to the pile of debris; and
    creating a static equilibrium diagram for the pile of debris;
    wherein characterizing the pile of debris is performed on one or more computing devices.

11. The method of claim 10 wherein there are at least three applied forces at each of the touch points, the at least three applied forces being a frictional force, a component force and a resultant force.

12. The method of claim 10 wherein the external forces comprise wind and precipitation.

13. A computer program product for removing material from a pile of debris comprising a plurality of blocks of material, the computer program product comprising:
    a non-transitory computer readable storage medium having computer readable program code embodied therewith, the computer readable program code comprising:
    (a) computer readable program code configured to characterize the pile of debris to create a static equilibrium diagram illustrating one or more forces acting on each of the plurality of blocks of material;
    (b) computer readable program code configured to rank the plurality of blocks of material according to a number of touch points that each block of material touches another block of material;
    (c) computer readable program code configured to identify at least one block having a least number of touch points;
    (d) computer readable program code configured to remove the at least one block from the static equilibrium diagram;
    (e) computer readable program code configured to determine if the at least one block is removable by a robot;
    (f) computer readable program code configured to determine if the pile of debris would be in static equilibrium after removal of the at least one block; and
    (g) computer readable program code configured to direct the robot to remove the at least one block.

14. The computer program product of claim 13 wherein in step (e), the block is removable by at least two robots and in step (g), the at least two robots are directed to remove the at least one block.

15. The computer program product of claim 13 wherein a result of computer readable program code configured to determine in step (f) is that the pile of debris would not be in static equilibrium and further comprising computer readable program code configured to repeat steps (c) to (f) until the result in step (f) is that the pile of debris would be in static equilibrium.

16. The computer program product of claim 13 wherein in step (e), further to determine if at least one additional robot is required to hold up at least one remaining block after removal of the at least one block.

17. The computer program product of claim 13 wherein computer readable program code configured to characterize the pile of debris comprises:
  computer readable program code configured to visually segregate the pile of debris into each of the plurality of blocks;
  computer readable program code configured to visually capture a size, shape of color of each of the plurality of blocks;
  computer readable program code configured to visually identify an angular displacement of each of the plurality of blocks;
  computer readable program code configured to identify materials that comprise each of the plurality of blocks from the color of each of the plurality of blocks;
  computer readable program code configured to identify a density of each of the plurality of blocks from the materials that comprise each of the plurality of blocks;
  computer readable program code configured to identify a coefficient of friction of each of the plurality of blocks from the materials that comprise each of the plurality of blocks;
  computer readable program code configured to determine a weight of each of the plurality of blocks from the materials, size and shape of each of the plurality of blocks;
  computer readable program code configured to visually identify touch points of each of the plurality of blocks and determine at least one applied force at each of the touch points;
  computer readable program code configured to determine external forces applied to the pile of debris; and
  computer readable program code configured to create a static equilibrium diagram for the pile of debris.

18. The computer program product of claim 17 wherein there are at least three applied forces at each of the touch points, the at least three applied forces being a frictional force, a component force and a resultant force.

19. The computer program product of claim 17 wherein the external forces comprise wind and precipitation.

20. A computer program product for characterizing a pile of debris, the computer program product comprising:
  a non-transitory computer readable storage medium having computer readable program code embodied therewith, the computer readable program code comprising:
  computer readable program code configured to visually segregate the pile of debris into each of the plurality of blocks;
  computer readable program code configured to visually capture a size, shape of color of each of the plurality of blocks;
  computer readable program code configured to visually identify an angular displacement of each of the plurality of blocks;
  computer readable program code configured to visually identify materials that comprise each of the plurality of blocks from the color of each of the plurality of blocks;
  computer readable program code configured to identify a density of each of the plurality of blocks from the materials that comprise each of the plurality of blocks;
  computer readable program code configured to identify coefficient of friction of each of the plurality of blocks from the materials that comprise each of the plurality of blocks;
  computer readable program code configured to determine a weight of each of the plurality of blocks from the materials, size and shape of each of the plurality of blocks;
  computer readable program code configured to visually identify touch points of each of the plurality of blocks and determine at least one applied force at each of the touch points;
  computer readable program code configured to determine external forces applied to the pile of debris; and
  computer readable program code configured to create a static equilibrium diagram for the pile of debris.

21. The computer program product of claim 20 wherein there are at least three applied forces at each of the touch points, the at least three applied forces being a frictional force, a component force and a resultant force.

22. The computer program product of claim 20 wherein the external forces comprise wind and precipitation.

23. A system of removing material from a pile of debris comprising a plurality of blocks of material comprising:
  a plurality of video devices surrounding a pile of debris;
  at least one computer processor in cooperation with the plurality of video devices to characterize the pile of debris to create a static equilibrium diagram illustrating one or more forces acting on each of the plurality of blocks of material;
  a module in the at least one computer processor to rank the plurality of blocks of material according to a number of touch points that each block of material touches another block of material;
  a module in the at least one computer processor to identify at least one block having a least number of touch points;
  a module in the at least one computer processor to remove the at least one block from the static equilibrium diagram;
  a module in the at least one computer processor to determine if the at least one block is removable by a robot;
  a module in the at least one computer processor to determine if the pile of debris would be in static equilibrium after removal of the at least one block; and
  a module in the at least one computer processor to direct the robot to remove the at least one block from the pile of debris.

* * * * *